United States Patent
Kobayashi et al.

(10) Patent No.: US 7,324,754 B2
(45) Date of Patent: Jan. 29, 2008

(54) OPTICAL CODE DIVISION MULTIPLEX TRANSMISSION METHOD AND OPTICAL CODE DIVISION MULTIPLEX TRANSMISSION DEVICE

(75) Inventors: Shuko Kobayashi, Kanagawa (JP); Akihiko Nishiki, Tokyo (JP); Satoko Kutsuzawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 513 days.

(21) Appl. No.: 10/868,918

(22) Filed: Jun. 17, 2004

(65) Prior Publication Data

US 2004/0264965 A1 Dec. 30, 2004

(30) Foreign Application Priority Data

Jun. 26, 2003 (JP) .............................. 2003-183388

(51) Int. Cl.
*H04J 14/00* (2006.01)
(52) U.S. Cl. .......................................... 398/77; 398/78
(58) Field of Classification Search ............. 398/77–78
See application file for complete search history.

(56) References Cited

FOREIGN PATENT DOCUMENTS

JP 2003-244101 8/2003

OTHER PUBLICATIONS

Ibsen et al, Phase Encoding and Decoding of Short Pulses at 10 Gb/s Using Superstructed Fiber Bragg Gratings, IEEE Photonics Technology Letters, vol. 13, No. 2, Feb. 2001.*

Zixiong et al, "A novel strain method for precisely adjusting the grating chirp and center wavelength", Smart Mater. Struct. 9 (2000),pp. 985-988.*

(Continued)

*Primary Examiner*—Jason Chan
(74) *Attorney, Agent, or Firm*—Rabin & Berdo, P.C.

(57) ABSTRACT

An object of the present invention is to adjust the operating wavelength of a decoder, in order to coordinate the operating characteristics of an encoder and the decoder. To this end, an optical code division multiplex transmission device of the present invention comprises a second SSFBG in the decoder, and has a mechanism to perform adjustment (phase adjustment step) of the fixation portion interval L which is the interval between a first and second fixation portions fixing in place the second SSFBG, such that the extent of the eye opening of optical pulses output from the second SSFBG is maximum. The extent of the eye opening is measured using a correlation waveform monitor, and the measurement data is sent to the wavelength control portion. A signal is sent from the wavelength control portion to the movement control portion to set the fixation portion interval L, based on data relating to the extent of the eye opening sent from the correlation waveform monitor.

3 Claims, 10 Drawing Sheets

OTHER PUBLICATIONS

Gupta et al, "Computer Control of Fiber Bragg Grating Spectral Characteristics Using a Thermal Head", Journal of Lightwave Technology, vol. 15, No. 10, Oct. 1997.*

Keiser, "Optical Fiber Communications", pp. 554-557, 2000.*

Petropoulos et al., "Demonstration of a 64-Chip OCDMA System Using Superstructured Fiber Gratings and Time-Gating Detection". IEEE Photonics Technology Letters, vol. 13, No. 11, pp. 1239-1241, Nov. 2001.

Yusuke Nasu et al., "Multiple-phase-shift superstructure fiber Bragg gratings(MPS-SSFBG's) for dense WDM systems", OECC/IOOC2001, pp. 34-35.

Morten Ibsen et al., "8-channel Bi-directional Spectrally Interleaved OCDMA/DWDM experiment employment 16-chip, four-level phase coding gratings", OECC 2002 technical Digest Jul. 2002, 11A 1-1.

Dr. H. Fathallah, "Optical CDMA: Extending the life of Optical Networks". APN, INC.

* cited by examiner

US 7,324,754 B2

OPTICAL CODE DIVISION MULTIPLEX TRANSMISSION METHOD AND OPTICAL CODE DIVISION MULTIPLEX TRANSMISSION DEVICE

BACKGROUND OF THE INVENTION

1. Field of the Invention

The present invention relates to a method of encoding and decoding optical pulse signals in optical code division multiplex transmission, and to a device to realize this method.

2. Description of Related Art

In recent years communication demands have expanded rapidly with the spread of the Internet and other developments. In order to cope with this, high-speed large-capacity networks employing optical fibers and similar are being prepared. In order to construct such high-speed and large-capacity optical networks, wavelength division multiplexing (WDM) transmission methods are indispensable. In particular, so-called dense wavelength division multiplexing (DWDM) methods, in which the wavelength intervals of optical carrier waves assigned to different channels are narrowed and dense wavelength multiplexing on the wavelength axis is employed, are attracting attention.

However, in a DWDM system which realizes this method, because the wavelength bandwidths of usable optical carrier waves are finite, there is a limit to the multiplexing density of a DWDM system. The wavelength bandwidths of optical carrier waves are limited by the fact that the oscillation wavelength band of the semiconductor laser which is the light source generating the optical carrier wave is limited, and by the fact that the wavelength bands which can be transmitted by the optical fiber which is the transmission path are limited. Also, when the wavelength intervals of the optical carrier waves allocated among channels are narrowed, overlap of the optical spectra between adjacent channels (also called "crosstalk") may cause the problem of degradation of transmitted optical pulse signals.

Transmission using optical code division multiplexing (OCDM) is therefore attracting attention as means of resolving the above problems. In OCDM transmission, optical pulse signals (resulting from optical modulation of optical pulse trains, or conversion of electrical pulse signals into optical pulse signals) for a plurality of channels are generated in parallel, these are modulated by different codes for each channel (encoded), and by decoding on the receiving side using the same code as was used for encoding on the transmission side, the original parallel optical pulse signals are restored (decoded). This method can be used together with existing WDM or DWDM transmission systems.

In transmission by OCDM, optical pulse signals for numerous channels can be transmitted simultaneously at the same wavelength. Further, transmission methods using OCDM are methods in which the same code is used on the transmitting side and on the receiving side as a key (the code set in the encoder and decoder is sometimes called a key), so that there is the advantage of highly secure transmission.

Further, in OCDM transmission methods, compared with transmission methods using conventional optical time division multiplexing (OTDM) and WDM, simpler component elements can be used to configure devices to construct complex but flexible networks.

As means of OCDM encoding, the OCDM phase encoding method, using the optical phase as the code, is known. Specifically, Superstructured Fiber Bragg Gratings (SSFBGs) are used as the encoder and decoder. As explained above, in OCDM transmission the same code is used as a key on the transmitting side and on the receiving side; but the Bragg reflection characteristics (hereafter also called "operating characteristics") which are the operating characteristics of the SSFBG comprised by the encoder or decoder change with the ambient temperature and other conditions. Further, when installing an SSFBG in an encoder or decoder, it is in actuality difficult to perform installation such that the operating characteristics of the SSFBGs comprised by the encoder and decoder are the same.

Hence it is necessary to adjust the operating characteristics of at least one of the SSFBGs comprised by the encoder and decoder as appropriate, such that the operating characteristics of the SSFBG comprised by the transmitting-side encoder and the SSFBG comprised by the receiving-side decoder are always the same. Constantly maintaining the operating characteristics of the SSFBG comprised by the transmitting-side encoder and the SSFBG comprised by the receiving-side decoder so as to be the same is sometimes called coordinating the operating characteristics.

In transmission by phase encoding OCDM, if the operating wavelength of the SSFBG comprised by the transmitting-side encoder and the operating wavelength of the SSFBG comprised by the receiving-side decoder deviate by several tens of pm or more, satisfactory decoding on the receiving side is not possible. That is, adjustments must be performed as necessary such that the difference in the Bragg wavelengths of the SSFBG comprised by the transmitting-side encoder and the SSFBG comprised by the receiving-side decoder is within several tens of pm.

Phase encoding OCDM using SSFBGs in an encoder and decoder has for example been reported by P. Petropoulos (see P. Petropoulos et al, "Demonstration of a 64-chip OCDMA System Using Superstructured Fiber Gratings and Time-Gating Detection", IEEE Photonics Technology Letters, Vol. 13, No. 11, November 2001, pp. 1239-1241), but no method has been disclosed for performing adjustments such that the operating wavelengths of the SSFBG comprised by the transmitting-side encoder and the SSFBG comprised by the receiving-side decoder are always the same.

It is possible that at the time of installation in an encoder or in a decoder, an SSFBG may be installed in the encoder or decoder such that the operating wavelength of the encoder or decoder is in a shifted state. Further, during transmission or reception operation, an encoder or decoder may be affected by the ambient temperature or other changes in the environment, so that the operating wavelength changes.

Hence an object of the present invention is to provide a method to continuously coordinate the operating wavelengths of both even in such cases, as well as to provide a device which realizes such a method.

SUMMARY OF THE INVENTION

In order to attain the above object, an optical code division multiplex transmission method of the present invention, comprising an encoding step on the transmitting side performed using an encoder comprising a first SSFBG and a decoding step on the receiving side performed using a decoder comprising a second SSFBG having a phase structure (superstructure) opposite that of the first SSFBG, further comprises the a phase adjustment step described below.

In the encoding step, encoding is performed using Bragg reflection characteristics (operating characteristics) arising from the superstructure of the first SSFBG, and in the decoding step, decoding is performed using operating characteristics arising from the superstructure of the second SSFBG.

The phase adjustment step is a step of measuring the extent of the eye opening of the optical pulse output from the second SSFBG, and adjusting the operating wavelength of the second SSFBG such that the extent of the eye opening is maximum.

If the ambient temperature and other conditions coincide perfectly for the encoder and decoder on the transmitting side and receiving side respectively, then a signal encoded by the encoder can be decoded without distortion as the same signal as the signal prior to decoding. That is, if in this case the extent of the eye opening of the optical pulse output from the second SSFBG which is the decoder is measured, the extent of the eye opening is maximum.

As explained in detail below, the eye opening indicates the degree of autocorrelation of optical pulses serving as signals; hence when optical pulses serving as signals are decoded without distortion, the extent of the eye opening is maximum. That is, the smaller the distortion in the shape of optical pulses serving as signals, the higher is the degree of autocorrelation, and the higher the degree of autocorrelation of optical pulses, the greater is the extent of the eye opening. The eye opening can for example be measured using a correlation waveform monitor, for example, Optical Sampling Oscilloscope, or similar.

On the other hand, if the ambient temperature and other conditions are different for the encoder and decoder on the transmitting side and receiving side respectively, then a signal encoded by the encoder is not decoded as the same signal as the signal prior to decoding. That is, the decoded optical pulse is distorted. In this case, if the extent of the eye opening of optical pulses output from the second SSFBG which is the decoder are measured by the correlation waveform monitor, then the extent of the eye opening is small compared with the case in which, as described above, the optical pulse waveform is decoded without distortion.

Hence if the operating wavelength of the second SSFBG is adjusted such that the extent of the eye opening is maximum, the signal encoded by the encoder is decoded without distortion as the same signal as the signal before decoding by the decoder, and optical code division multiplex transmission can be performed in the optimum state.

It is preferable that the above phase adjustment step comprise the following steps.

Step S1: Acquire a first data item reflecting the extent of the eye opening of an optical pulse output from the second SSFBG comprised by the decoder.

Step S2: Displace the operating wavelength of the second SSFBG toward the short-wavelength side.

Step S3: Acquire a second data item reflecting the extent of the eye opening of an optical pulse output from the second SSFBG.

Step S4: Compare the first data item and the second data item.

Step S5: If the extent of the eye opening corresponding to the first data item is smaller than or equal to the extent of the eye opening corresponding to the second data item, return to step S2. If the extent of the eye opening corresponding to the first data item is larger than the extent of the eye opening corresponding to the second data item, displace the operating wavelength of the second SSFBG toward the long-wavelength side.

Step S6: Acquire a third data item reflecting the extent of the eye opening of an optical pulse output from the second SSFBG.

Step S7: Compare the first data item and the third data item.

Step S8: If the extent of the eye opening corresponding to the first data item is larger than or equal to the extent of the eye opening corresponding to the third data item, return to step S5. If the extent of the eye opening corresponding to the first data item is smaller than the extent of the eye opening corresponding to the third data item, interchange the third data item and the first data item, and return to step S2.

By means of the steps in the above-described steps S1 through S8 to compare the first and second data items and to compare the first and third data items, the extent of the eye opening of optical pulses output from the second SSFBG can always be maintained at the maximum value.

A configuration is possible in which step S2 is a step to displace the Bragg reflection wavelength of the second SSFBG toward the long-wavelength side, and moreover step S5 is a step to displace the Bragg reflection wavelength of the second SSFBG toward the short-wavelength side. If the phase adjustment steps are configured with step S2 and step S5 in either of the above combinations, the same advantageous result is obtained. That is, configuration of the phase adjustment steps as either of the above-described combinations of step S2 and step S5 is no more than a design consideration, and the invention has the same advantageous result whichever configuration is employed. Hence the following explanation is limited to a configuration in which step S2 is a step of displacing the Bragg reflection wavelength of the second SSFBG toward the short-wavelength side and step S5 is a step of displacing the Bragg reflection wavelength of the second SSFBG toward the long-wavelength side.

The displacement of the Bragg reflection wavelength of the second SSFBG toward the short-wavelength side performed in the above step S2 can be achieved by shortening the grating interval of the second SSFBG, by narrowing the intervals of fixed portions which fix the second SSFBG. On the other hand, the displacement of the Bragg reflection wavelength of the second SSFBG toward the long-wavelength side performed in the above step S5 can be achieved by lengthening the lattice intervals of the second SSFBG, by broadening the intervals of the fixed portions which fix the second SSFBG.

Further, the displacement of the Bragg reflection wavelength of the second SSFBG toward the short-wavelength side performed in the above step S2 can be achieved by shortening the effective lattice interval of the second SSFBG, by lowering the temperature of the second SSFBG. On the other hand, the displacement of the Bragg reflection wavelength of the second SSFBG toward the long-wavelength side performed in the above step S5 can be achieved by lengthening the effective lattice interval of the second SSFBG, by raising the temperature of the second SSFBG.

A suitable example of an optical code division multiplex transmission device to realize the above-described optical code division multiplex transmission method comprises, on the transmitting side, an encoder comprising a first SSFBG, and on the receiving side, a decoder comprising a second SSFBG with the phase structure (superstructure) opposite that of the first SSFBG, a wavelength control portion and a correlation waveform monitor; the decoder comprises the second SSFBG, a base plate, a first fixed portion, a second fixed portion, and a movement control portion. The second SSFBG is fixed to the first fixed portion and to the second fixed portion, and the movement control portion is configured with a movable portion mounted on the first fixed portion and the base plate mounted via the movable portion.

Connections are made such that data from the correlation waveform monitor relating to the extent of the eye opening of optical pulses output from the second SSFBG is supplied to the wavelength control portion, and signals to adjust the interval between the fixed portions which fix the second SSFBG are supplied to the movement control unit from the wavelength control unit.

Another suitable example of an optical code division multiplex transmission device to realize the above-described optical code division multiplex transmission method comprises, on the transmitting side, an encoder comprising a first SSFBG, and on the receiving side, a decoder configured comprising a second SSFBG having a phase structure (superstructure) opposite that of the first SSFBG, a wavelength control portion, and a correlation waveform monitor. This decoder comprises a second SSFBG, a base plate, and a temperature control portion. The temperature control portion comprises a thermo-module, temperature sensor, and temperature controller; the second SSFBG adheres closely to the base plate. By this means, the temperature of the second SSFBG can be made substantially equal to the temperature of the base plate, and adjustment of the temperature of the second SSFBG is performed by adjusting the temperature of the base plate. The correlation waveform monitor and wavelength control portion are connected, and data relating to the extent of the eye opening is sent from the correlation waveform monitor to the wavelength control portion. The temperature sensor and temperature controller are connected, and data relating to the temperature of the base plate is sent to the temperature controller. The wavelength control portion and thermo-module are connected via the temperature controller, and instructions to increase or to decrease the extent of the eye opening are output, in the form of an electrical signal, from the wavelength control portion to the temperature controller; based on this signal, the temperature controller can supply power to raise or to lower the temperature of the thermo-module.

By means of an optical code division multiplex transmission device configured comprising the above-described movement control portion or temperature control portion, the above-described step S1 through step S8 can be executed in the correlation waveform monitor, wavelength control portion, and movement control portion, or in the correlation waveform monitor, wavelength control portion, and temperature control portion.

BRIEF DESCRIPTION OF THE DRAWINGS

The foregoing and other objects, features and advantageous of the present invention will be better understood from the following description taken in connection with the accompanying drawings, in which.

DESCRIPTION OF THE PREFERRED EMBODIMENTS

Figure 1:
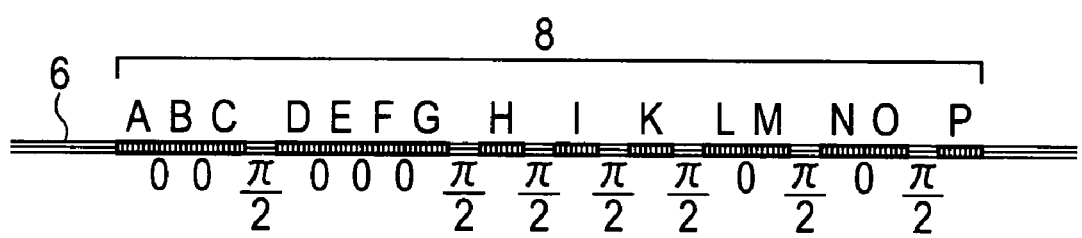
FIG. 1 is a drawing of the configuration of an SSFBG fabricated using a 15-bit M-sequence code.

Below, embodiments of the present invention are explained with reference to the drawings. Each of the drawings merely shows an example of a configuration of the invention, showing in summary cross-sectional shapes, positional relationships and similar of components to an extent sufficient to enable understanding, but the invention is not limited to these drawing examples. In the following explanation, specific materials, conditions and similar may be used, but these are merely suitable examples of materials and conditions, and thus do not limit the scope of the invention. Similar components in the drawings are assigned the same numbers, and redundant explanations may be omitted.

In the drawings described below, optical fibers and other optical signal paths are indicated by thick lines, and electrical signal paths are indicated by thin lines. Numbers assigned to these thick lines and thin lines, in addition to denoting the paths themselves, also denote the optical signals or electrical signals which propagate in the respective paths.

SSFBG

The construction of an SSFBG used for encoding the phase information of an optical pulse signal is explained, referring to FIG. 1. The SSFBG has a construction in which the SSFBG formation portion 8 is built into the optical fiber 6.

FIG. 1 is a summary drawing of the configuration of an SSFBG used in an encoder or decoder fabricated using a 15-bit M-sequence code. In FIG. 1, the portion constituting the SSFBG formation portion 8 is configured by arranging in a series in a single optical fiber component units indicated by A through P. The component units indicated by A through P are optical fiber gratings, all of equal length, and having the same diffraction grating spacing (the same Bragg reflection wavelength). Below, each of these component units is referred to as a unit optical fiber grating (unit FBG). That is, the unit FBGs indicated by A through P all have the same length, and moreover have the same Bragg reflection wavelength.

The SSFBG formation portion 8 is formed by connecting in a series a plurality of unit FBGs; adjacent unit FBGs are either positioned in close proximity to each other, or adjacent unit FBGs are positioned separated by an interval equivalent to a phase difference of $\pi/2$ of the optical carrier wave. Here, the interval equivalent to the phase difference $\pi/2$ is, if the wavelength of the optical carrier wave is $\lambda$, an interval equivalent to $\lambda/4$. Thus an SSFBG comprising portions in which adjacent unit FBGs are positioned in close proximity and portions in which adjacent unit FBGs are positioned separately by an interval equivalent to a phase difference of $\pi/2$ can be regarded as an SSFBG having a multi-point phase-shifting structure. At which positions to provide intervals corresponding to a phase difference of $\pi/2$ when arranging the unit FBGs is discussed below.

As shown in FIG. 1, an SSFBG combines unit FBGs having a periodic structure of the effective refractive index with period Λ, and periodic structures taking unit FBGs as structural units and comprising intervals equivalent to π/2 phase differences; hence the periodic structure of the effective refractive index of the SSFBG overall is called a superstructure, or an SSFBG phase structure.

If the unit FBGs are arranged without gaps, light at wavelengths satisfying the relation λ=2nΛ is reflected. That is, the reflection spectrum has a single maximum value λ, and assumes a bell shape which is symmetrical about this maximum. On the other hand, if unit FBGs are positioned such that there is an interval equivalent to a phase difference of π/2 between adjacent unit FBGs, the shape of the spectrum of light reflected from an SSFBG of such a construction will be complex and different from the above-described bell shape.

Hence if an SSFBG is configured with adjacent unit FBGs positioned in close proximity in some places and separated by an interval equivalent to a phase difference of π/2 in other places as shown in FIG. 1, according to a fixed rule as explained below, the SSFBG becomes a reflector having a distinct reflection characteristic (a reflection spectrum) corresponding to this rule.

If an optical pulse is made incident on this reflector, the optical pulse is modulated according to the phase structure of the SSFBG which has a distinct reflection characteristic corresponding to the above rule. Modulation of the shape of a reflected optical pulse by such an SSFBG is called encoding. If an optical pulse signal, obtained by modulation by an electrical pulse signal of a train of optical pulses spaced at equal intervals on the time axis, is made incident on an SSFBG similarly to the above optical pulse, the optical pulse signal is modulated according to the phase structure of the SSFBG, which has a distinct reflection characteristic conforming to the above rule. That is, the optical pulse signal is encoded.

If optical pulse signals encoded as described above are made incident on and emitted from an SSFBG having the same phase structure as during encoding, but in directions opposite those of incidence onto and emission from the SSFBG at the time of encoding, then the optical pulse signals prior to encoding are reproduced. That is, if upon encoding an optical pulse signal is made incident on and emitted from the side on which the unit FBG indicated by A is positioned in the SSFBG shown in FIG. 1 to perform encoding, then if the encoded optical pulse signal is made incident on and emitted from the side on which the unit FBG indicated by P is positioned in the SSFBG of FIG. 1, decoding is possible.

In this embodiment of the invention, in order to configure the phase structure (superstructure) of an SSFBG having a multi-point phase shift construction, it is assumed than an M-sequence code is used as the code on which the SSFBG configuration is based.

As one example, the 15-bit M-sequence code shown below is used to explain a method of configuration of an SSFBG used in an encoder or decoder. The following code sequence is considered as a 15-bit M-sequence code.

Fifteen-bit code: 0,0,0,1,1,1,1,0,1,0,1,1,0,0,1

When this code is converted into a bipolar code, the following is obtained.

Fifteen-bit bipolar code: 1,1,1,−1,−1,−1,−1,1,−1,1,−1,−1,1,1,−1

When this bipolar code is converted into a phase code, the following results.

Fifteen-bit phase code: 0,0,0,π,π,π,π,0,π,0,π,π,0,0,π

When, based on this 15-bit phase code, the SSFBG phase-shift portion (the portions at which intervals equivalent to a phase difference of π/2 are inserted) arrangement is determined, the following results.

Phase shift portion arrangement: 0,0,π/2,0,0,0,π/2,π/2,π/2,π/2,0,π/2,0,π/2

As the meanings of the series of 14 terms of "0" and "π/2" indicating the arrangement in the above phase-shift portion, the first term indicates that the phase shift amount at the boundary between the unit FBGs A and B is 0;

the second term indicates that the phase shift amount at the boundary between the unit FBGs B and C is 0;

the third term indicates that the phase shift amount at the boundary between the unit FBGs C and D is π/2;

the fourth term indicates that the phase shift amount at the boundary between the unit FBGs D and E is 0;

the fifth term indicates that the phase shift amount at the boundary between the unit FBGs E and F is 0;

the sixth term indicates that the phase shift amount at the boundary between the unit FBGs F and G is 0;

the seventh term indicates that the phase shift amount at the boundary between the unit FBGs G and H is π/2;

the eighth term indicates that the phase shift amount at the boundary between the unit FBGs H and I is π/2;

the ninth term indicates that the phase shift amount at the boundary between the unit FBGs I and K is π/2;

the tenth term indicates that the phase shift amount at the boundary between the unit FBGs K and L is π/2;

the eleventh term indicates that the phase shift amount at the boundary between the unit FBGs L and M is 0;

the twelfth term indicates that the phase shift amount at the boundary between the unit FBGs M and N is π/2;

the thirteenth term indicates that the phase shift amount at the boundary between the unit FBGs N and O is 0; and, the fourteenth term indicates that the phase shift amount at the boundary between the unit FBGs O and P is π/2.

As explained above, in order to fabricate an SSFBG reflecting the 15-bit M-sequence code described above, it is sufficient to arrange 15 unit FBGs, as shown in FIG. 1.

FIRST EMBODIMENT

Figure 2:
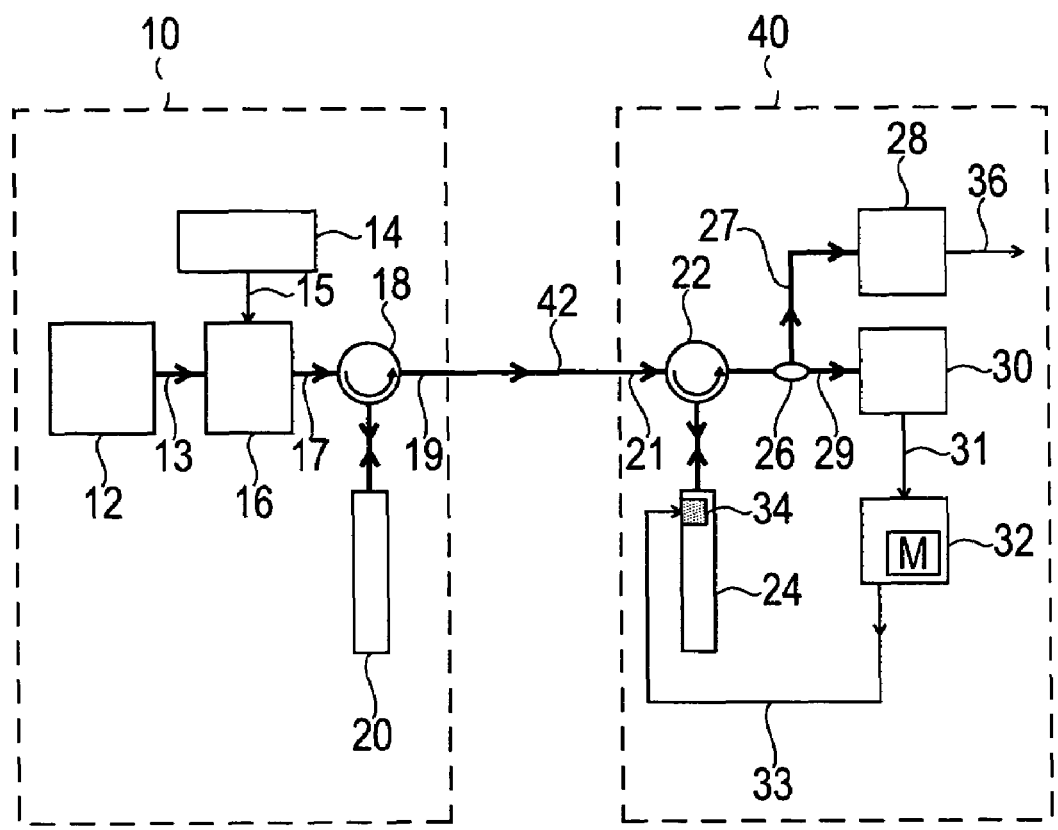
FIG. 2 is a block diagram of the optical code division multiplex transmission device of a first embodiment.

With reference to the block diagram shown in FIG. 2, an optical code division multiplex transmission method which is a first embodiment of the present invention is explained, together with the configuration of an optical code division multiplex transmission device and functions of each portion of same.

The optical code division multiplex transmission device comprises a transmitting portion 10 and a receiving portion 40, connected by a transmission path 42. Signals transmitted by this optical code division multiplex transmission device are optical pulse signals; the optical pulse signals are signals obtained by opto-electrical conversion of binary digital electrical pulse signals carrying information to be transmitted (these signals are pulse signals in which the binary digital signal values "0" or "1" are represented by high and low voltages).

The transmitting portion 10 is configured comprising an optical pulse train generator 12, modulation signal generator 14, optical modulator 16, first optical circulator 18, and encoder 20. The optical pulse train generator 12 generates an optical pulse train 13. The modulation signal generator 14 supplies information to be transmitted, as binary digital electrical pulse signals 15, to the optical modulator 16.

The optical pulse signals 17 to be transmitted which are output from the optical modulator 16 are made incident on the encoder 20 via the first optical circulator 18. Encoded optical pulse signals are sent from the encoder 20 to the transmission path 42, again via the first optical circulator 18. Optical pulse signals 19 which have been sent to the transmission path 42 via the first optical circulator 18 propagate along the transmission path to the receiving portion 40.

The receiving portion 40 is configured comprising a second optical circulator 22, decoder 24, optical coupler 26, opto-electrical converter 28, correlation waveform monitor (for example, Optical Sampling Oscilloscope) 30, and wavelength control portion 32. The opto-electrical converter 28 converts optical pulse signals 27 into electrical pulse signals 36. The correlation waveform monitor 30 measures the degree of autocorrelation (the extent of the eye opening) of optical pulse signals 29. The wavelength control portion 32 receives the output 31 from the correlation waveform monitor 30 and supplies a control signal 33 to the movement control portion 34. The output 31 of the correlation waveform monitor 30 is an electrical signal which reflects the degree of autocorrelation (the extent of the eye opening) of optical pulse signals 29.

Optical pulse signals 21 which are transmitted by propagation along the transmission path 42 are incident on the decoder 24 via the second optical circulator 22, and are decoded. A decoded optical pulse signal is incident on the optical coupler 26, again via the second optical circulator 22, and is split into an optical pulse signal 27 and optical pulse signal 29. The optical pulse signal 27 is restored to an electrical pulse signal 36 by the opto-electrical converter 28. That is, the binary digital electrical pulse signals 15 which represent the information to be transmitted are restored to binary digital electrical pulse signals 36 and received by the receiving portion 40.

The first SSFBG comprised by the encoder 20 and the second SSFBG comprised by the decoder 24 have the same phase structure, and moreover the first SSFBG and second SSFBG are configured such that the phase structures are in a reversed relationship. That is, if the first SSFBG comprised by the encoder 20 and the second SSFBG comprised by the decoder 24 are configured with the unit FBGs arranged in the order ABCDEFGHIKLMNOP, as shown in FIG. 1, then if the input/output end of the first SSFBG comprised by the encoder 20 is for example the side on which the unit FBG denoted by A is positioned, then the second SSFBG comprised by the decoder 24 is configured such that the unit FBG denoted by P is positioned at the input/output end.

Here, a case is considered in which for some reason, such as the ambient temperature, a difference occurs in the phase structures of the first SSFBG and the second SSFBG comprised by the encoder 20 and decoder 24 respectively. In this case, it is necessary to adjust the phase structure of the second SSFBG comprised by the decoder 24 so as to be equal to the phase structure of the first SSFBG comprised by the encoder 20.

Figure 3:
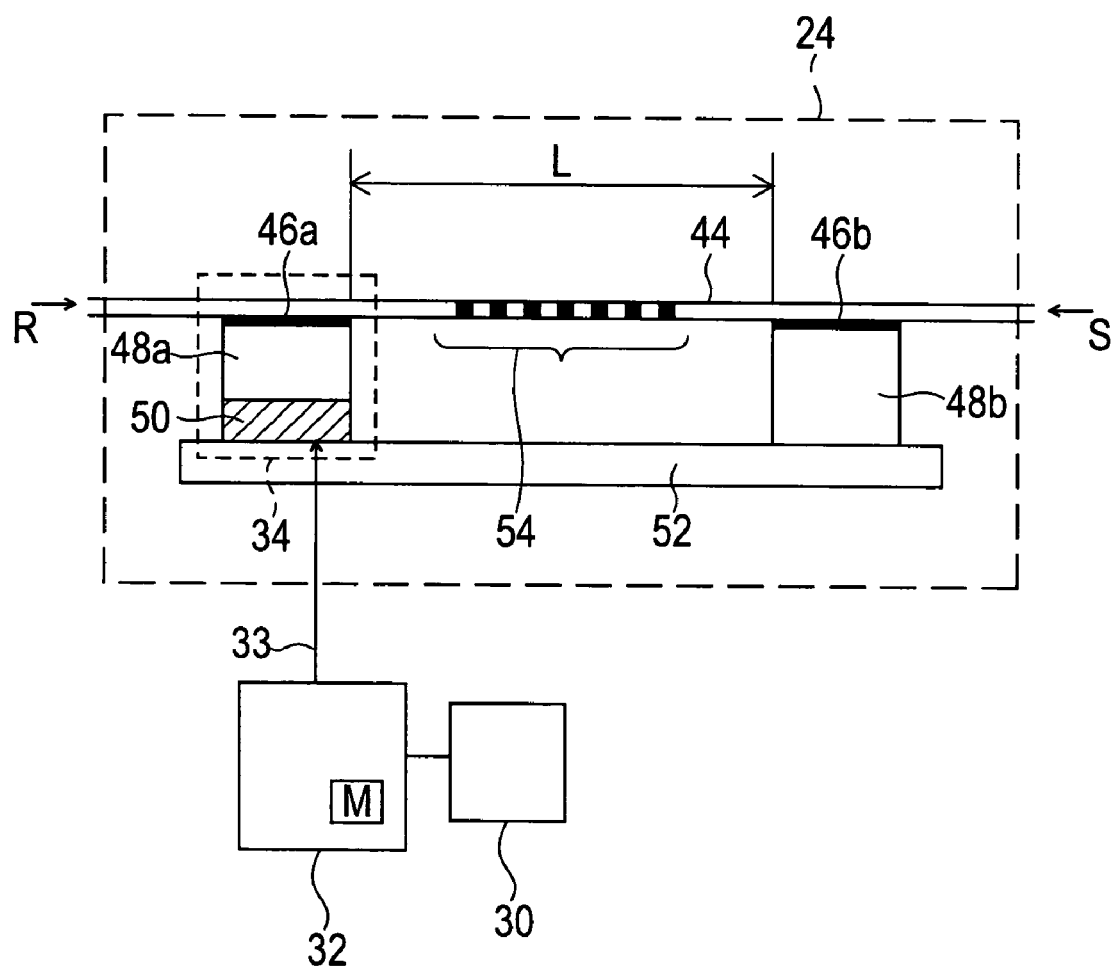
FIG. 3 is a summary diagram of a decoder comprising a movement control portion.

The construction of a decoder comprising a movement control portion capable of the above-described adjustment is explained, together with the functions of each of the portions thereof, referring to FIG. 3. FIG. 3 is a summary drawing of a decoder comprising a movement control portion. Adjustments to render equivalent the phase structures of the first SSFBG and second SSFBG comprised by the encoder 20 and decoder 24 respectively may in principle be performed at the encoder 20 or at the decoder 24 with an equivalent result. That is, whether the above-described phase structure adjustment is performed on the first SSFBG comprised by the encoder 20 or on the second SSFBG comprised by the decoder 24 is merely a matter of the design of the optical code division multiplex transmission device; hence in this embodiment of the invention, a configuration was adopted in which the adjustment is performed on the second SSFBG comprised by the decoder 24.

When the decoder 24 shown in FIG. 3 is installed in the optical code division multiplex transmission device shown in FIG. 2, the side on which is connected the second optical circulator 22 may be the side indicated by R in FIG. 3, or may be the side indicated by S in FIG. 3. However, if the side on which is connected the second optical circulator 22 is the side indicated by R in FIG. 3, connection of the encoder 20 with the same configuration as the decoder in FIG. 3 to the first optical circulator 18 must be such that the connection side of the first optical circulator 18 is the side indicated by S.

Of course, when connecting the side indicated by S in FIG. 3 with the second optical circulator 22, the side indicated by R of the encoder with the same configuration as the decoder shown in FIG. 3 must be the side of connection with the first optical circulator 18.

The decoder 24 is configured by fixing the second SSFBG 44, comprising the SSFBG formation portion 54, to the first fixation portion 48a and second fixation portion 48b with adhesive 46a and 46b. The first fixation portion 48a is fixed, via the movable portion 50, to the base plate 52; the second fixation portion 48b is fixed directly to the base plate 52. Whether the movable portion 50 is installed on the side of the first fixation portion 48a or on the side of the second fixation portion 48b is merely a design matter, and installation may be on either side. Hereafter, in place of referring to a first fixation portion 48a and second fixation portion 48b, for simplicity both are referred to simply as the fixation portions 48a and 48b.

When the decoder 24 is constructed as shown in FIG. 3, the movement control portion 34 is equivalent to the portion surrounded by the dashed-line rectangle.

The movable portion 50 is configured comprising a precision one-axis stage and a stepping motor which drives the micrometer of the precision one-axis stage. The precision one-axis stage is configured to be movable in the horizontal direction in FIG. 3. By means of this configuration, the stepping motor is operated to drive the micrometer based on a control signal 33 from the wavelength control portion 32, and by thus sliding the precision one-axis stage, the interval L between fixed portions can be changed.

When the fixed portions 48a and 48b are fixed to the base plate 52, they are fixed in a state in which tension is applied to the second SSFBG 44. That is, in the state in which the movable portion 50 is at the operating reference point (the point at which the operation amount is 0), tension acts on the second SSFBG 44. By setting the second SSFBG 44 in this state, the Bragg reflection wavelength of the second SSFBG 44 can be adjusted to shorter wavelengths or to longer wavelengths, centered on the operating reference point of the movable portion.

As the adhesive 46a, 46b which fixes the fixed portions 48a, 48b and the second SSFBG 44, in addition to an epoxy, acrylic or other adhesive, solder, glass frit, or similar can be used. In this embodiment of the invention, VTC-2, produced by Summers Optical, was used.

The encoder 20, shown in FIG. 2, of the optical code division multiplex transmission device can be realized with the same configuration as the decoder 24 shown in FIG. 3. When configured as an encoder, there is no need to provide a movement control portion 34. That is, the fixed portion 48a may also be bonded directly to the base plate 52.

When fixing the second SSFBG 44 to the first fixed portion 48a and second fixed portion 48b, direct fixing as shown in FIG. 3 is also possible; but a method may also be used in which the second SSFBG 44 is fixed with an adhesive member to a fixing plate which is a new portion in advance, and this fixing plate is fixed to the fixed portion 48a or 48b. By means of such a construction, there is the advantage that attachment and detachment of the second SSFBG 44 to the fixed portions 48a and 48b is facilitated. That is, replacement with an SSFBG with a different phase structure is easy.

In the decoder shown in FIG. 3, if the movable portion 50 is shifted to the left in the drawing, the interval L between the fixed portions can be broadened. As a result the second SSFBG 44 is stretched, and the period of the structure of periodic change in the effective refractive index change of the fiber grating forming the phase structure is lengthened. This is accompanied by a shift of the Bragg reflection wavelength toward longer wavelengths. Conversely, if the movable portion 50 is shifted to the right in the figure, the Bragg reflection wavelength is shifted toward shorter wavelengths.

If the movable portion 50 is moved leftward in the drawing by an amount $\Delta L$, the interval L between the fixed portions becomes $L+\Delta L$. If the movable portion 50 is moved rightward in the drawing by $\Delta L$, the interval L between fixed portions becomes $L-\Delta L$. On the other hand, it is known that the relation between $\Delta L/L$, which is the expansion or contraction per unit length $\epsilon$ of the optical fiber grating, and the wavelength change $\Delta \lambda$ of the Bragg reflection wavelength, is given by the following equation (1) (see for example Andreas Othonos and Kyriacos Kalli, *Fiber Bragg Gratings*).

$$\Delta\lambda = \lambda(\Delta L/L)(1-p) \quad (1)$$

Here p is the effective strain-optic constant, and is given as a function of the stress tensor components and Poisson ratio of the glass material comprised by the optical fiber and of the effective refractive index of the optical fiber.

From equation (1), the change $\Delta\lambda$ in the Bragg reflection wavelength is given as a function of the movement amount $\Delta L$ of the movable portion 50, that is, of the change in length of the second SSFBG 44.

Figure 4:
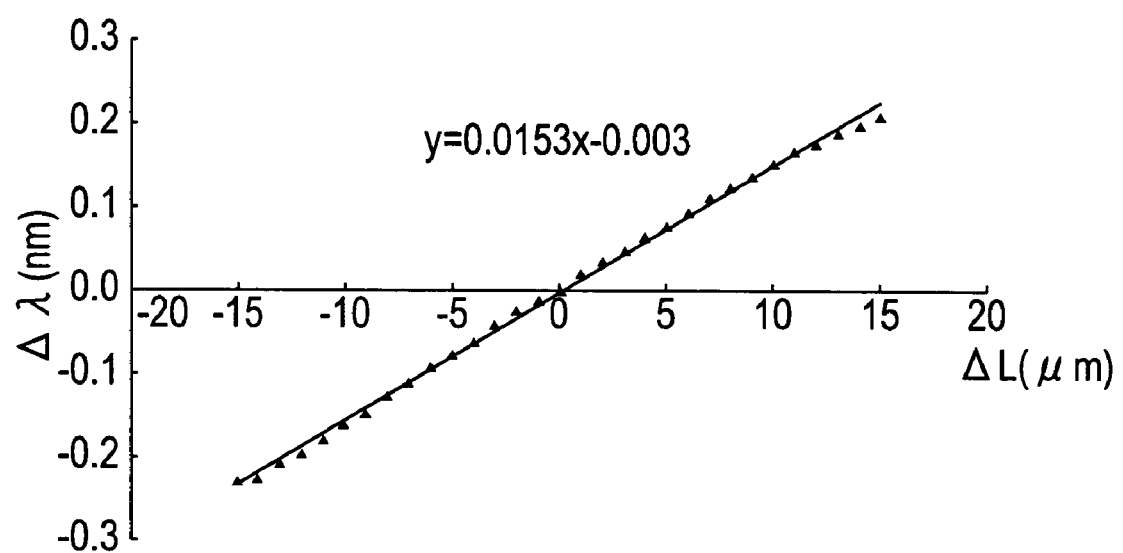
FIG. 4 is a graph showing the change $\Delta\lambda$ in the Bragg reflection wavelength with the amount of movement $\Delta L$ of the movable portion 50 of the decoder of the first embodiment of the invention.

Referring to FIG. 4, the relation between the amount of expansion or contraction $\Delta L$ of the optical fiber grating and the change $\Delta\lambda$ in the Bragg reflection wavelength is explained. FIG. 4 is a graph showing the change $\Delta\lambda$ in the Bragg reflection wavelength with the movement amount $\Delta L$ of the movable portion 50 of the decoder of the first embodiment of the present invention. The horizontal axis (x axis) in FIG. 4 indicates the amount of expansion or contraction $\Delta L$ of the optical fiber grating, and the vertical axis (y axis) indicates the change $\Delta\lambda$ in the Bragg reflection wavelength. In FIG. 4, the points denoted by black triangles are measurement points, and the result of smoothing of these measurement points is indicated by a straight line. This straight line is described by the empirical formula of the following equation (2). The units of the amount of movement x of the movable portion are microns (μm), and the units of the change in Bragg reflection wavelength are nanometers (nm).

$$y = 0.0153x - 0.003 \quad (2)$$

Whether the value of the amount of expansion or contraction $\Delta L$ of the optical fiber grating indicated by the horizontal axis is positive or negative corresponds to whether the movable portion has moved, relative to the operating reference point, in a direction to expand or to contract the optical fiber grating. On the other hand, the change $\Delta\lambda$ in the Bragg reflection wavelength indicated by the vertical axis takes on a positive value when the Bragg reflection wavelength shifts toward longer wavelengths, and a negative value for shifts toward shorter wavelengths. From the graph, it may be concluded that when the optical fiber grating is caused to expand the Bragg reflection wavelength is shifted toward longer wavelengths, and when the optical fiber grating is caused to contract the Bragg reflection wavelength is shifted toward shorter wavelengths.

From FIG. 4, the change $\Delta\lambda$ in the Bragg reflection wavelength for a movement amount $\Delta L=1$ μm of the movable portion 50 can be read as 0.015 nm. Also, the change $\Delta\lambda$ in the Bragg reflection wavelength for a movement amount $\Delta L=\pm 15$ μm of the movable portion 50 can be read as $\pm 0.2$ nm. Hence when the encoder 20 and decoder 24 are mounted in the optical code division multiplex transmission device, because in the initial state the tensions of the SSFBG incorporated into the encoder 20 and of the SSFBG incorporated into the decoder 24 are different when mounted and for other reasons, if the Bragg reflection characteristics are different by approximately $\pm 0.2$ nm, this difference can be accommodate by adjusting the movable portion 50 by approximately $\pm 15$ μm. That is, adjustment is performed such that the Bragg reflection characteristics of the SSFBG incorporated into the encoder 20 and of the SSFBG incorporated into the decoder 24 are the same. In other words, the operating characteristics of the SSFBG comprised by the transmitting-side encoder and of the SSFBG comprised by the receiving-side decoder are coordinated.

Further, in the first embodiment the movable portion 50 is configured comprising a precision one-axis stage and a stepping motor which drives the micrometer of the precision one-axis stage; but a configuration can also be employed using a piezo-stage in which one-axis operation is effected by a piezoelectric element. A piezo-stage can be operated with higher precision than a one-axis stage configured using a micrometer, so that the phase adjustment step can be performed with greater accuracy.

Next, the manner in which the shape of an optical pulse signal on the time axis changes during the period in which the optical pulse signals is sent from the transmitting portion 10 to the receiving portion 40 is explained. For simplicity, in the explanation the optical pulse signal is assumed to be an optical pulse train arranged regularly on the time axis at constant intervals, and the shapes of each of the optical pulses comprised by the pulse train on the time axis are taken to be Gaussian.

An optical pulse train encoded by the encoder 20 is decoded by the decoder 24. When a decoded optical pulse train is observed using the correlation waveform monitor 30, an eye opening diagram is observed. This observation can be performed in the receiving portion 40 of FIG. 2 by tapping a portion of the optical pulse signals using the optical coupler 26. Here, "tapping" refers to using an optical coupler or other branch filter to extract a portion of the signal light of optical pulse signals by intensity division (energy division).

A portion 29 of the optical pulse signals tapped using the optical coupler 26 is supplied to the correlation waveform monitor 30, and the eye opening diagram is observed. An optical pulse signal tapped by the optical coupler 26 is an optical pulse signal decoded by the decoder 24 and supplied to the optical coupler 26 via the second optical circulator 22.

Figure 5A:
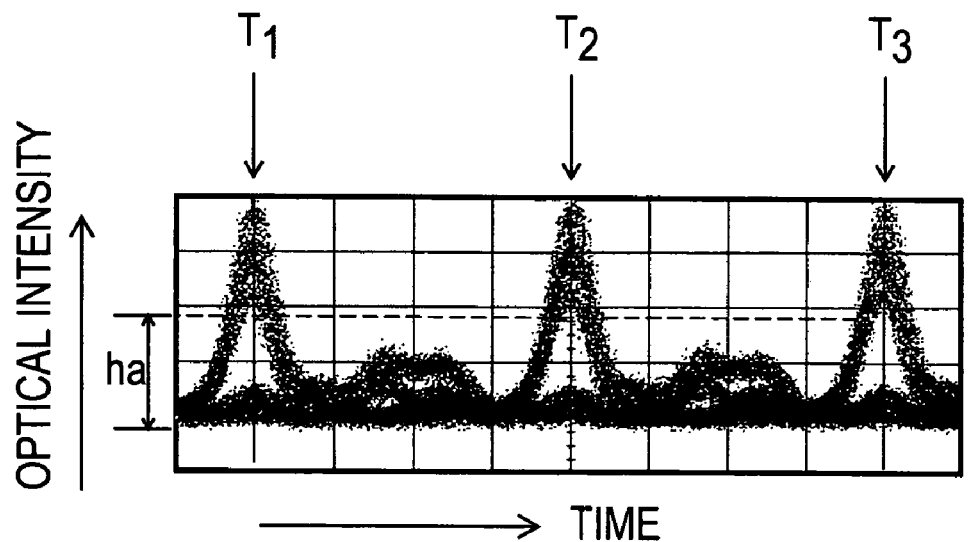
FIGS. 5(A) and 5(B) show an eye opening diagram for an optical pulse train, respectively.
Figure 5B:
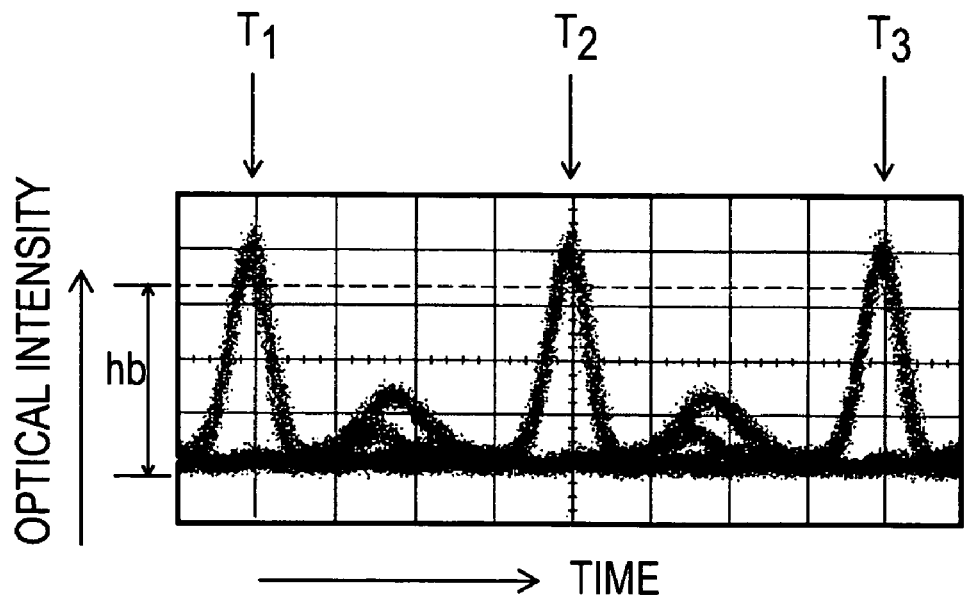

FIGS. 5(A) and 5(B) show examples of the eye opening diagrams for optical pulse trains observed by the correlation waveform monitor 30. In FIGS. 5(A) and 5(B), the horizontal axis is the time axis (arbitrary scale), and the vertical axis indicates the optical intensity (arbitrary scale). The graphs in FIGS. 5(A) and 5(B) are graphs obtained by scanning the optical pulse trains arriving at the correlation waveform monitor 30 at fixed time intervals, and superposing the traces of the optical pulses.

That is, if the shapes of optical pulses arriving at the correlation waveform monitor 30 change hardly at all, each time an optical pulse of the same shape is scanned, an optical pulse of in substantially the same shape is superposed, so that the superposed optical pulse trace is observed to be thin. As a result, among the traces describing the optical pulses (of Gaussian shape), the eye openings, formed by the time axis and by the surrounding optical pulse trace closest in position to the time axis, is broadened. On the other hand, if the shapes of optical pulses arriving at the correlation waveform monitor 30 are deformed, optical pulses of different shapes are superposed upon each scanning, so that the superposed optical pulse traces are observed to be thick. As a result, the eye opening becomes narrow.

In the eye opening diagrams shown in FIGS. 5(A) and 5(B), three optical pulses are seen at positions indicated by the arrows T1, T2, T3 in the diagrams. Small peaks are observed between these three optical pulses (between the arrows T1 and T2, and between the arrows T2 and T3); these are noise. This noise can be eliminated by threshold filtering or other processing during opto-electrical conversion of the optical pulse signals in the receiving portion 40.

The broadness of the eye openings is ideally represented by the area surrounded by the time axis and the optical pulse trace closest to the time axis, but calculation of this area is difficult for technical reasons. Hence in this embodiment of the invention, the broadness of the eye openings is expressed by the heights ha or hb, at the optical pulse peak positions, from the time axis to the lowermost position of the optical pulse trace, as indicated in the eye opening diagrams shown in FIGS. 5(A) and 5(B).

If the shape of optical pulses arriving at the correlation waveform monitor 30 changes, the optical pulse trace will be observed to be thick, as in the eye diagram shown in FIG. 5(A). Hence the eye opening becomes narrow, and the height ha from the time axis to the lowermost position of the optical pulse trace is also lowered. On the other hand, if the shape of optical pulses arriving at the correlation waveform monitor 30 does not change, the optical pulse trace is observed to be thin, as in the eye diagram shown in FIG. 5(B). Hence the eye opening becomes broad, and the height hb from the time axis to the lowermost position of the optical pulse trace is higher.

Figure 6:
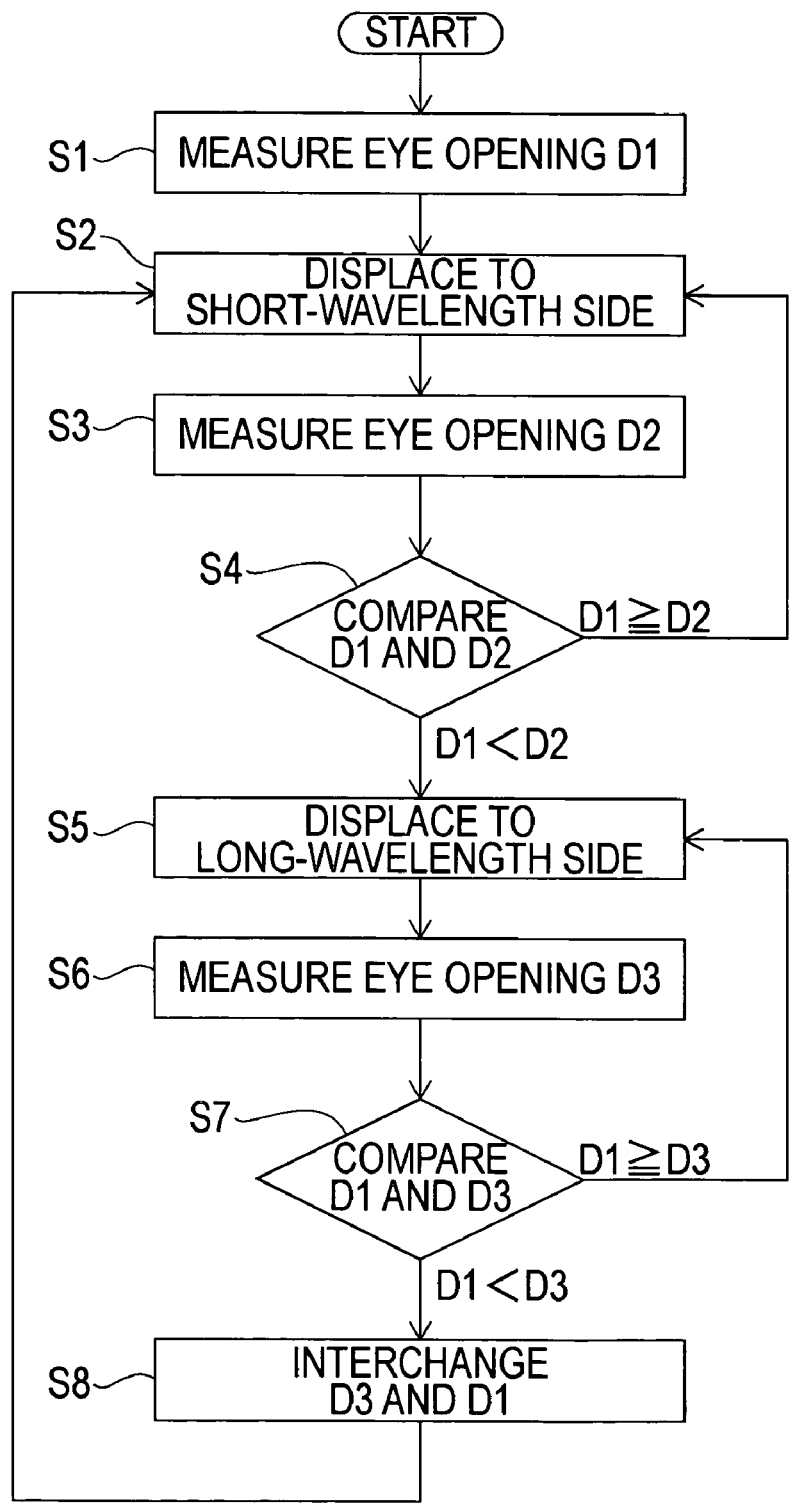
FIG. 6 is a flowchart of the phase adjustment step.

Next, FIG. 6 is used to explain the phase adjustment step, in which the extent of the eye opening of optical pulses output from the second SSFBG 44 is measured using the correlation waveform monitor, and the Bragg reflection wavelength of the second SSFBG 44 is adjusted such that the extent of this eye opening is maximum. FIG. 6 is a flowchart used to explain the phase adjustment step. The phase adjustment step comprises step S1 through step S8, explained below.

In steps S1 through S8 explained below, the operations of displacing the Bragg reflection wavelength of the second SSFBG 44 toward the short-wavelength side or toward the long-wavelength side, and of comparing first, second and third data items, may be performed manually, or similar operations may be performed by a computer.

Step S1 is a step in which a first data item D1 is acquired reflecting the extent of the eye opening of optical pulses output from the second SSFBG 44 comprised by the decoder. The correlation waveform monitor 30 is used to observe the extent of the eye opening of optical pulses 29 output via the second optical circulator 22 and optical coupler 26 from the second SSFBG 44 comprised by the decoder. The value of the first data item D1 reflecting this extent of the eye opening is made to correspond to the height in the eye opening diagram at an optical pulse peak position from the time axis to the lowermost position of the optical pulse trace. That is, the first data item D1 corresponds to ha or hb in FIG. 5.

In step S1, when a measurement is performed indicating that D1=h1, this is stored in storage media. Storage in storage media means that a human visually reads the eye opening extent from the correlation waveform monitor 30 and records this value on paper or similar. Interchanging of data means that data recorded on paper or similar is erased and overwritten. Of course, these operations to read the eye opening extents, record data and interchange data can be performed, wholly or in part, by a computer. In the following description also, storage in storage media and interchanging of data have meanings similar to those above.

When for example data is stored in the above-described storage media by a computer, the storage media can be located in the correlation waveform monitor 30, or in the wavelength control portion 32, or in another location. Where to locate the storage media is merely a matter of design. In FIG. 2 and FIG. 3, cases are depicted assuming that the storage media M is located in the wavelength control portion 32.

Step S2 is a step in which the Bragg reflection wavelength of the second SSFBG 44 is displaced toward the short-wavelength side. In this step, an instruction is output from the wavelength control portion 32 to the movement control portion 34 to contract the interval L between the fixed portions. Based on this instruction, in the movable portion 50 the stepping motor is driven so as to drive the micrometer of the precision one-axis stage, moving the precision one-axis stage rightward, in an operation to contract the interval L between fixed portions.

Step S3 is a step of acquiring a second data item D2 which reflects the extent of the eye opening of optical pulses output from the second SSFBG 44. In step S2, the interval L between fixed portions is narrower than in step S1, so that the Bragg reflection wavelength of the second SSFBG 44 should be shifted toward short wavelengths. As a result, the extent of decoding in the second SSFBG 44 changes, and there is a change in the extent of the eye opening of optical pulses 29 output from the second SSFBG 44 comprised by the decoder.

In step S3, similarly to the operation in step S1, a second data item D2 is acquired reflecting the extent of the eye opening of optical pulses 29 output from the second SSFBG 44 comprised by the decoder. In step S3, when a measurement is performed indicating that D2=h2, this is stored in storage media M.

Step S4 is a step of comparing D1 and D2. In this step S4, the value h1 of D1 and the value h2 of D2 are compared, and if h1≦h2, processing returns to step S2, which is a step of displacing the Bragg reflection wavelength of the second SSFBG 44 toward short wavelengths. If on the other hand h1>h2, processing proceeds to the next step S5.

Step S5 is a step in which the Bragg reflection wavelength of the second SSFBG 44 is displaced toward long wavelengths. That is, in this step an instruction is issued from the wavelength control portion 32 to the movement control portion 34 causing the interval L between the fixed portions to be broadened compared with the interval L between the fixed portions set in step S2. Based on this instruction, in the movable portion 50 the stepping motor is driven so as to drive the micrometer of the precision one-axis stage, moving the precision one-axis stage leftward, in an operation which broadens the interval L between the fixed portions.

Step S6 is a step of acquiring a third data item D3 which reflects the extent of the eye opening of optical pulses output from the second SSFBG 44. In step S6, the interval L between fixed portions is broadened compared with the interval L in step S3, so that the Bragg reflection wavelength of the second SSFBG 44 should be shifted toward the long-wavelength side compared with that in step S3. By this means the extent of decoding in the second SSFBG 44 changes from that in step S3. Hence the extent of the eye opening of optical pulses 29 output from the second SSFBG 44 comprised by the decoder is changed compared with that in step S3.

In step S6, similarly to the operations performed in step S1 and in step S3, a third data item D3 is acquired reflecting the extent of the eye opening of optical pulses 29 output from the second SSFBG 44 comprised by the decoder. In step S6, when a measurement is performed indicating that D3=h3, this is stored in storage media M.

Step S7 is a step in which D1 and D3 are compared. In this step S7, the value h1 of D1 and the value h3 of D3 are compared, and if $h1 \geq h3$, processing returns to step S5, which is a step in which the Bragg reflection wavelength of the second SSFBG 44 is displaced toward the long-wavelength side. If on the other hand h1<h3, processing proceeds to the next step S8.

Step S8 is a step in which D3 is interchanged with D1. That is, in step S6 the information stored as D3=h3 in the storage media M is overwritten with D1=h3. After this step S8 ends, processing returns to step S2.

By continuing the above-described steps S1 through S8 during the period in which optical code division multiplex transmitted signals are being received, the extent of the eye opening of the optical pulses 29 output from the second SSFBG 44 comprised by the decoder can be constantly maintained at the maximum, and reception can be continued.

Figure 7:
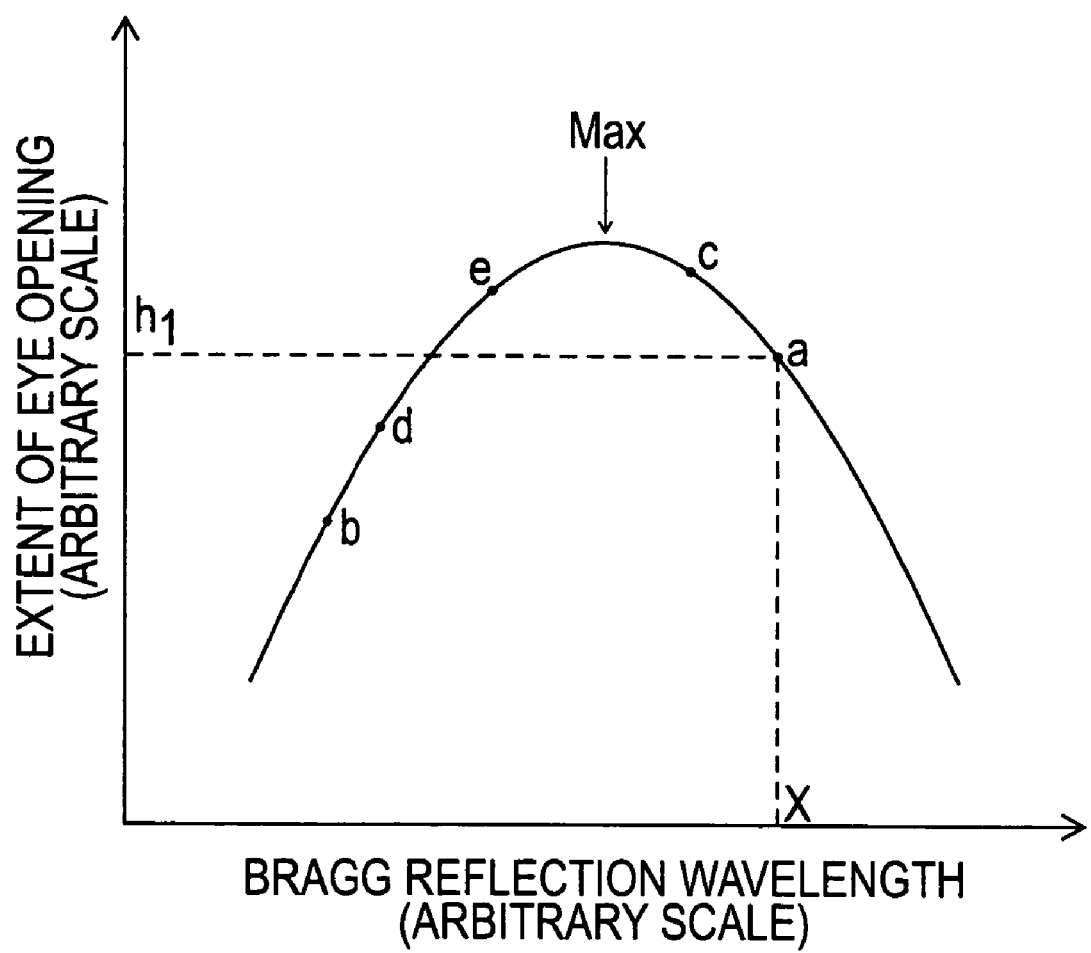
FIG. 7 is a drawing used to explain the manner of change of the extent of the eye opening in the phase adjustment step.

The manner in which the extent of the eye opening of optical pulses 29 output from the second SSFBG 44 comprised by the decoder during the above-described step S1 through step S8 is explained, referring to FIG. 7. FIG. 7 is a drawing used to explain the manner of change of the extent of the eye opening in the phase adjustment step, which comprises the above-described step S1 through step S8. The horizontal axis in FIG. 7 indicates, on an arbitrary scale, the Bragg reflection wavelength of the second SSFBG 44. The vertical axis indicates, on an arbitrary scale, the extent of the eye opening. Here the extent of the eye opening refers to the height, at a peak position of an optical pulse in an eye opening diagram, from the time axis to the lowermost position of the optical pulse trace, as denoted by h1, h2, h3, or similar.

The extent of the eye opening h1, which is the first data item D1 measured in step S1, is taken to correspond to point a in FIG. 7. That is, the observed extent of the eye opening for a position X at which the movable portion 50 exists when the second SSFBG 44 is installed in the decoder (with the amount of movement from the reference point at this time being 0), is taken to be h1.

In step S3, similarly to the operation in step S1, the second data item D2 is acquired, reflecting the extent of the eye opening of optical pulses output from the second SSFBG 44 comprised by the decoder. That is, in step S3 the measurement D2=h2 is performed, and the extent of the eye opening h2 corresponding to this is taken to correspond to point b shown in FIG. 7. Then because D1>D2, that is, h1>h2, processing proceeds to the next step S5.

Suppose on the other hand that in step S3 the measurement D2=h2 is performed, and the extent of the eye opening h2 corresponding to this corresponds to point c in FIG. 7. Then D1<D2, that is, h1<h2, so that processing returns to step S2, which is a step in which the Bragg reflection wavelength of the second SSFBG 44 is displaced toward the short-wavelength side. Operation is then performed once again to displace the Bragg reflection wavelength of the second SSFBG 44 toward the short-wavelength side.

This operation is performed until the result D1>D2, that is, h1>h2 is obtained. That is, an operation is performed to displace the Bragg reflection wavelength of the second SSFBG 44 to the short-wavelength side, toward the state in which the eye openings are maximum, as indicated by "Max" and an arrow in FIG. 7. When, as a result of this repetition of the operation to displace the Bragg reflection wavelength of the second SSFBG 44 to the short-wavelength side the extent of the eye opening h2 exceeds the position indicated by "Max" and an arrow in FIG. 7, the Bragg reflection wavelength of the second SSFBG 44 changes to the short-wavelength side, and D1>D2, that is h1>h2, processing proceeds-to the next step S5.

Suppose that as a result of repetition of the operation to displace the Bragg reflection wavelength of the second SSFBG 44 to the short-wavelength side, the extent of the eye opening h2 exceeds the position indicated by "Max" and an arrow in FIG. 7, and the extent of the eye opening h2 changes until reaching the position corresponding to point d in FIG. 7. In this case, in step S4 the value h1 of D1 and the value h2 of D2 are compared, and the result that D1>D2, that is, h1>h2 is obtained, so that processing proceeds to the next step S5.

In step S5, the second SSFBG 44 is expanded, so that the Bragg reflection wavelength is displaced to the long-wavelength side. Consequently the extent of the eye opening h2 changes from the position corresponding to point d shown in FIG. 7, toward the position corresponding to point e which is on the long-wavelength side. And in step S6, as a result of acquisition of the third data item D3 reflecting the extent of the eye opening of optical pulses 29 output from the second SSFBG 44 comprised by the decoder, the measurement D3=h3 is performed, and the extent of the eye opening h3 is assumed to correspond to point e in FIG. 7.

In step S7, D1 and D3 are compared. In this step S7 the value h1 of D1 and the value h3 of D3 are compared, and while D1>D3, that is, while h1>h3, processing returns to step S5, which is a step to displace the Bragg reflection wavelength of the second SSFBG 44 to the long-wavelength side. That is, the difference in the heights above the vertical axis of point a and point e in FIG. 7 is compared, and while the height above the vertical axis of point e is lower than the height above the vertical axis of point a, processing returns to step S5, which is the step to displace the Bragg reflection wavelength of the second SSFBG 44 to the long-wavelength side.

On the other hand, when the Bragg reflection wavelength of the second SSFBG 44 is continuously displaced to the long-wavelength side such that D1<D3, that is, h1<h3, processing proceeds to the next step S8. That is, the difference in heights above the vertical axis of point a and point e in FIG. 7 is compared, and if the height above the vertical axis of point e is higher than the height above the vertical axis of point a, processing proceeds to the next step S8.

Step S8 is a step of interchanging D3 with D1. That is, in this step the information stored in the storage media M that D3=h3 in step S6 is overwritten with the information D1=h3. Upon advancing to step S8, the height above the vertical axis of the point e is higher than the height above the vertical axis of point a. Hence when this interchanging is performed, point a is reset to the short-wavelength side compared with the state in which the eye opening is maximum, indicated by "Max" and an arrow.

When point a is reset in this way, processing returns to step S2. Step S2 is a step in which the Bragg reflection wavelength of the second SSFBG 44 is displaced to the short-wavelength side, so that point a moves leftward in FIG. 7, that is, toward the short-wavelength side. As a result, if the extent of the eye opening increases then step S2 is executed to perform further displacement to the short-wavelength side, and if the eye opening grows smaller processing proceeds to step S5, which is a step to perform displacement to the long-wavelength side. Thereafter, steps subsequent to step S5 are executed repeatedly.

As explained above, by executing the steps from step S1 to step S8, the extent of the eye opening of optical pulses 29 output from the second SSFBG 44 comprised by the decoder can always be maintained at maximum, and reception can be continued.

In the above explanation, the extent of the eye opening h1 which is the first data item D1 measured in step S1 is assumed to correspond to point a in FIG. 7, and the starting-point is taken to be the case in which the position of point a is on the long-wavelength side of the state in which the eye opening is maximum, indicated by "Max" and an arrow. But even in a case in which the position of point a is on the short-wavelength side of the state in which the eye opening is maximum, indicated by "Max" and an arrow, similarly to the above explanation, if the extent of the eye opening is tracked according to the flowchart shown in FIG. 6, then the extent of the eye opening of optical pulses 29 output from the second SSFBG 44 comprised by the decoder can be maintained at maximum, similarly to the explanation above, and reception can be continued.

Further, even if step S2 is taken to be the step in which the Bragg reflection wavelength of the second SSFBG 44 is displaced toward the long-wavelength side, and moreover step S5 is taken to be the step in which the Bragg reflection wavelength of the second SSFBG 44 is displaced toward the short-wavelength side, by similarly making the above considerations, the extent of the eye opening of optical pulses 29 output from the second SSFBG 44 comprised by the decoder can be constantly maintained at maximum, and reception can be continued.

SECOND EMBODIMENT

Figure 8:
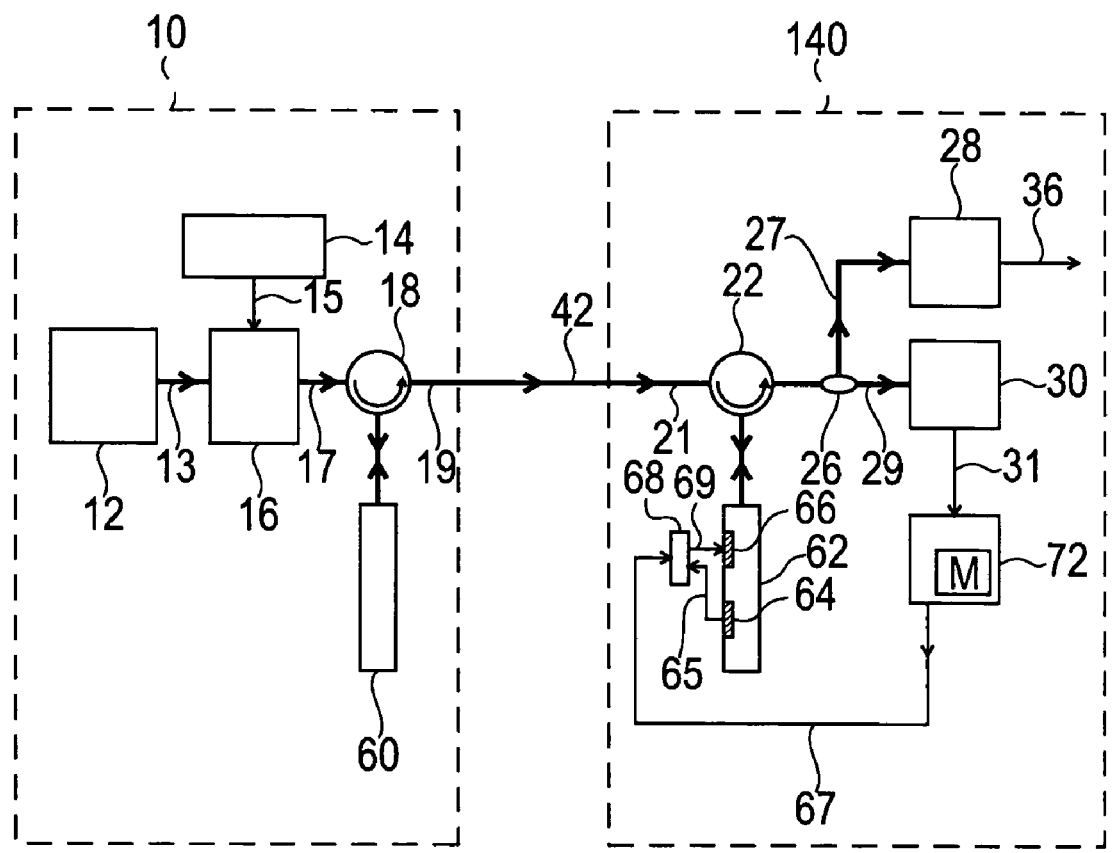
FIG. 8 is a block diagram of the optical code division multiplex transmission device of a second embodiment.

With reference to the block diagram shown in FIG. 8, an optical code division multiplex transmission method and the configuration of an optical code division multiplex transmission device which are a second embodiment of the present invention are explained, together with the functions of portions thereof. In the following, explanations of portions which are redundant with the optical code division multiplex transmission method and the optical code division multiplex transmission device which are the first embodiment, and with the functions of portions thereof, are omitted.

The optical code division multiplex transmission device which is the second embodiment of the present invention also comprises a transmitting portion 10 and receiving portion 140, which are connected by a transmission path 42; the transmitting portion 10 is configured comprising an optical pulse train generator 12, modulation signal generator 14, optical modulator 16, first optical circulator 18, and encoder 60. The difference with the optical code division multiplex transmission method and optical code division multiplex transmission device which are the first embodiment of the present invention consists in the configuration of the receiving portion 140.

That is, the decoder comprised by the receiving portion. 140 comprises, in place of the movement control portion 34 used as a component in the first embodiment of the present invention, a temperature control portion 74 comprising a thermo-module 66, temperature sensor 64, and temperature controller 68. As the thermo-module, a heating/cooling device comprising a Peltier element is used, and is capable not only of the heating function of the Peltier element but of a cooling function as well. The thermo-module may also use a heating device comprising a heater. In this case, heating relies on the heater function, but cooling employs natural cooling to obtain a similar result.

The receiving portion 140 is configured comprising a second optical circulator 22, decoder 62, optical coupler 26, opto-electrical converter 28, correlation waveform monitor 30, and wavelength control portion 72. As in the first embodiment, the first SSFBG comprised by the encoder 60 and the second SSFBG comprised by the decoder 62 have the same phase structure, and moreover the first SSFBG and second SSFBG are configured such that the phase structures are in a reversed relationship.

The correlation waveform monitor 30 measures the degree of autocorrelation (the extent of the eye opening) of optical pulse signals 29. The wavelength control portion 72 receives the output 31 from the correlation waveform monitor 30 and supplies a control signal 67 to the temperature controller 68. On receiving the control signal 67, the temperature controller 68 controls the current of the thermo-module 66 via the cable 69 based on the control signal 67, executing control to raise or to lower the temperature of the fixed region L' (see FIG. 9) of the second SSFBG 92.

The temperature sensor 64 is installed in the decoder 62, and the temperature of the second SSFBG 92 is constantly measured, and the result sent as a temperature signal 65 to the temperature controller 68. The wavelength control portion 72 calculates the temperature to be set in the second SSFBG 92 according to the output 31 from the correlation waveform monitor 30. A temperature control signal 67 is supplied to the temperature controller 68 so that this calculated temperature can be attained.

A case is assumed in which, due to the ambient temperature or other causes, a difference arises in the phase structures of the first SSFBG and the second SSFBG comprised by the encoder 60 and by the decoder 62 respectively. In this case, the phase structure of the second SSFBG comprised by the decoder 62 must be made equal to the phase structure of the first SSFBG comprised by the encoder 60, by adjusting the ambient temperature of the second SSFBG.

Figure 9:
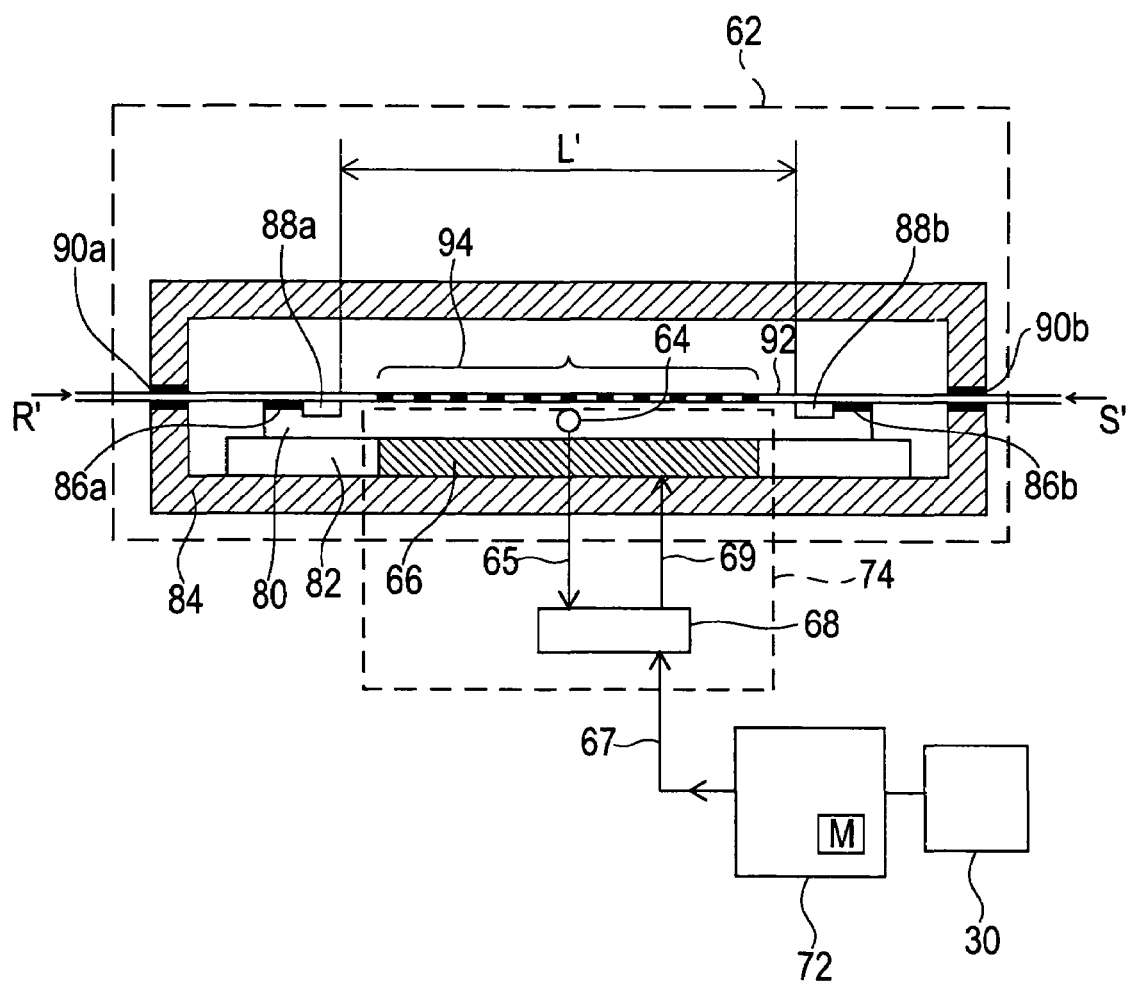
FIG. 9 is a summary diagram of a decoder comprising a thermo-module and temperature sensor; and, FIG. 10 is a graph showing the change $\Delta\lambda$ in the Bragg reflection wavelength with the temperature T of the second SSFBG comprised by the decoder of the second embodiment of the invention.

Referring to FIG. 9, the construction of the decoder comprising the thermo-module 66 and temperature sensor 64 and capable of the above-described adjustment is explained, together with the functions of portions thereof. FIG. 9 is a summary diagram of the decoder 62 comprising the thermo-module 66 and temperature sensor 64.

As in the case of the first embodiment, adjustments to render equivalent the phase structures of the first SSFBG and second SSFBG comprised by the encoder 60 and decoder 62 respectively may in principle be performed at the encoder 60 or at the decoder 62 with an equivalent result.

Hence in the second embodiment of the invention also, a configuration is adopted in which adjustments to render equivalent the phase structures of the first SSFBG and second SSFBG are performed on the second SSFBG 92 comprised by the decoder 62.

As in the case of the first embodiment, when the decoder shown in FIG. 9 is installed in the optical code division multiplex transmission device shown in FIG. 8, the side connected to the second optical circulator 22 may be taken to be the side indicated by R' in FIG. 9, or may be taken to be the side indicated by S' in FIG. 9. And also similarly to the case of the first embodiment, the side connecting the encoder 60 with the same configuration as the decoder shown in FIG. 9 and the first optical circulator 18 is taken to be the side indicated by S' in FIG. 9 or the side indicated by R' in FIG. 9 according to the above.

The decoder 62 is configured with the second SSFBG 92, comprising the SSFBG formation portion 94, fixed in place with adhesive 86a and 86b to the base plate 80. Grooves 88a and 88b are formed in the base plate 80, and heat supplied from the thermo-module 66 uniformly heats the fixed region L' of the second SSFBG 92. In the fixed region L' of the second SSFBG 92, the second SSFBG 92 is made to adhere closely to the base plate 80 using silicon grease, such that heat supplied from the thermo-module 66 uniformly heats the fixed region L' of the second SSFBG 92.

Heat-insulating material 82 is provided between the base plate 80 and housing 84 in order that the fixed region L' of the second SSFBG 92 can be uniformly heated or cooled with good efficiency. As the heat-insulating material 82, for example, glass epoxy material, or material with low thermal conductivity such as PEEK and mica can be used. A configuration is also possible in which the heat-insulating material 82 is removed and the base plate 80 is fixed in a bridge-like fashion using screws with low thermal conductivity, employing air for thermal insulation. The thermo-module 66 is controlled by the temperature controller 68 based on the temperature measured for example by a thermistor or other temperature sensor 64, employing heating (when using a heater), or both heating and cooling (when using a Peltier element), such that the temperature measured by the temperature sensor 64 becomes a prescribed temperature.

The temperature control portion 74 is equivalent to the portion surrounded by the dashed-line rectangle in the drawing, and is configured comprising the temperature sensor 64, thermo-module 66, and temperature controller 68; the action of the temperature sensor 64, thermo-module 66 and temperature controller 68 is as explained above.

In order to render the temperature distribution in the fixed region L' of the second SSFBG 92 uniform, it is preferable that the base plate 80 comprise a material such as copper with high thermal conductivity. In general, copper and other materials with high thermal conductivity also have a large thermal expansion coefficient, so that expansion and contraction of the base plate 80 occurs upon heating or cooling by the thermo-module 66. In the second embodiment of the present invention, a silicon gel which retains flexibility even after hardening is used as the adhesive 86a and 86b to fix the second SSFBG 92 to the base plate 80, so that expansion and contraction of the base plate 80 is not easily transferred to the second SSFBG 92.

In a configuration opposite that above, it is also possible to use in the base plate 80 a material having a low thermal expansion coefficient, such as for example Invar. Materials with a low thermal expansion coefficient, of which Invar is representative, generally have low thermal conductivity compared with that of copper or similar; and so in this case, as the thermo-module 66, a plurality of thermo-modules must be installed, and measures taken to ensure that the temperature distribution in the fixed region L' of the second SSFBG 92 is uniform.

It is preferable that the housing 84 be formed using a material such as aluminum with high thermal conductivity, in order not to impede the efficient dissipation of heat from the thermo-module 66 in contact with the housing 84. And by subjecting the inner surface of the housing 84 to metal plating or other treatment, the thermal dissipation of the thermo-module 66 can be improved sufficiently.

When the second SSFBG 92 is fixed to the housing 84 via the through-holes 90a and 90b, fixing is performed in a state in which tension is not applied to the second SSFBG 92. By setting the second SSFBG 92 in this state, the Bragg reflection wavelength of the second SSFBG 92 can be adjusted toward either the short-wavelength side or toward the long-wavelength side by controlling the temperature in the fixed region L' of the second SSFBG 92.

The encoder 60 of the optical code division multiplex transmission device shown in FIG. 8 is similar to that of the first embodiment of the present invention in that the encoder can be constructed with the same configuration as the decoder shown in FIG. 9.

In the decoder 62 shown in FIG. 9, the period of the periodically changing effective refractive index structure (effective lattice interval) of the fiber grating forming the phase structure of the second SSFBG 92 is lengthened when the temperature in the fixed region L' of the second SSFBG 92 is raised, and at the same time the amount of change in the refractive index in the periodically changing effective refractive index structure is increased. This is accompanied by a shift in the Bragg reflection wavelength toward the long-wavelength side. Conversely, if the temperature of the fixed region L' of the second SSFBG 92 falls, the Bragg reflection wavelength is shifted toward shorter wavelengths.

Here the principle is explained by which the period (effective lattice spacing) and amount of change in refractive index of the periodically changing refractive index structure of the fiber grating forming the phase structure of the second SSFBG 92 is controlled by raising and lowering the temperature in the fixed region L' of the second SSFBG 92.

It is known that the relation between the temperature change $\Delta T$ of the optical fiber grating and the wavelength change $\Delta \lambda$ of the Bragg reflection wavelength is given by the following equation (3) (see for example Andreas Othonos and Kyriacos Kalli, *Fiber Bragg Gratings*).

$$\Delta\lambda = \lambda \cdot \Delta T((1/\Lambda)(d\Lambda/dT) + (1/n_{eff})(dn_{eff}/\Delta T)) \quad (3)$$

Here $d\Lambda/dT$ is the thermal expansion coefficient of the optical fiber in which the optical fiber grating is formed. $\Lambda$ is the period of the periodic optical fiber grating refractive structure, and $n_{eff}$ is the effective refractive index of the optical fiber grating. $\Lambda$ and $n_{eff}$ are values which change with the optical fiber grating temperature.

The change in wavelength $\Delta\lambda$ of the Bragg reflection wavelength is seen from equation (3) to be a function of the temperature change of the optical fiber grating. A temperature change in the optical fiber grating occurs due to rises or falls in the temperature of the base plate 80 caused by the thermo-module 66 installed on the base plate 80, according to instructions to raise or lower the temperature output from the temperature controller 68. By raising or lowering the temperature of the base plate 80, the temperature of the second SSFBG 92, which is mounted so as to adhere in close proximity to the base plate 80, also rises and falls, and as a result the Bragg reflection wavelength of the second SSFBG 92 can be changed to the long-wavelength side or to the short-wavelength side.

Figure 10:
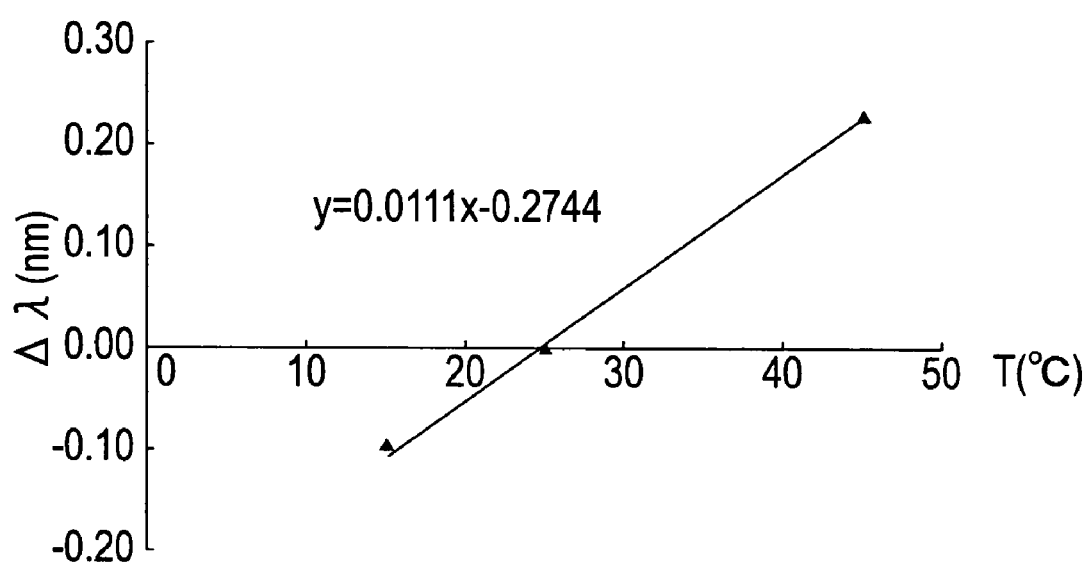

The relation between changes in the Bragg reflection wavelength $\Delta\lambda$ and the temperature T of the optical fiber grating is explained, referring to FIG. 10. FIG. 10 is a graph showing the change $\Delta\lambda$ in the Bragg reflection wavelength with the temperature T of the SSFBG formation portion 94 of the second SSFBG 92, in contact with the base plate 80, in the decoder of the second embodiment of the invention.

In FIG. 10, the horizontal axis (x axis) indicates the temperature T of the SSFBG formation portion 94, and the vertical axis (y axis) indicates the change $\Delta\lambda$ in the Bragg reflection wavelength. In FIG. 10, points indicated by black triangles are measurement points, and points resulting from smoothing of these measurement points are indicated by a straight line. This straight line is described by the empirical equation (4). The units of the temperature x are degrees Centigrade, and the units of the change y in the Bragg reflection wavelength are nanometers.

$$y=0.0111x-0.2744 \tag{4}$$

Whether the temperature of the SSFBG formation portion 94 of the second SSFBG 92 in contact with the base plate 80 in the decoder rises or falls corresponds to whether the temperature T of the SSFBG formation portion 94, indicated by the horizontal axis, is higher or lower than a reference temperature (in FIG. 10, 25° C.). On the other hand, the change $\Delta\lambda$ in Bragg reflection wavelength indicated by the vertical axis is positive-valued when the Bragg reflection wavelength changes toward the long-wavelength side, and $\Delta\lambda$ is negative-valued when the Bragg reflection wavelength changes toward the short-wavelength side. From FIG. 10, it is concluded that when the temperature of the optical fiber grating rises the Bragg reflection wavelength changes toward longer wavelengths, and when the temperature of the optical fiber grating falls the Bragg reflection wavelength changes toward shorter wavelengths.

From FIG. 10, it is seen that the change $\Delta\lambda$ in the Bragg reflection wavelength for a temperature change $\Delta T$ of 1° C. is 0.011 nm. It is also seen that a change in the temperature T of the SSFBG formation portion 94 from 15° C. to 45° C. results in a change $\Delta\lambda$ in the Bragg reflection wavelength of 0.3 nm. From this, if the temperature control portion 74 has a temperature control function with a precision of 0.1° C., the Bragg reflection wavelengths of the first SSFBG incorporated into the encoder 60 and of the second SSFBG 92 incorporated into the decoder 62 can be adjusted with a precision of 0.001 nm.

As explained above, by controlling the temperature of an SSFBG, the Bragg wavelength of the SSFBG can be controlled. That is, instead of controlling the Bragg wavelength of an SSFBG by controlling the tension of the SSFBG as in the optical code division multiplex transmission device of the first embodiment, it is seen that the temperature of the SSFBG can be controlled to control the Bragg wavelength of the SSFBG.

Hence the above explanation of the operation of the optical code division multiplex transmission device of the first embodiment also serves as an explanation of the operation of the optical code division multiplex transmission device of the second embodiment if, in places explaining the method of control of the Bragg reflection wavelength of the second SSFBG, explanations of tension control of the second SSFBG 44 are replaced with explanations of temperature control of the second SSFBG 92.

The phase adjustment step explained referring to FIG. 6, in which the Bragg reflection wavelength of the second SSFBG 44 is adjusted such that the extent of the eye opening of optical pulses output from the second SSFBG 44 is maximum, applies to the second embodiment also if the following changes are made.

That is, in step S2, which is the step to displace the Bragg reflection wavelength of the second SSFBG 44 toward the short-wavelength side, the description of output of an instruction from the wavelength control portion 32 to the movement control portion 34 so as to contract the fixed portion interval L is replaced by output of an instruction from the wavelength control portion 72 to the temperature controller 68 to lower the temperature of the SSFBG formation portion 94 of the second SSFBG 92 in contact with the base plate 80.

And, in step S5, which is the step to displace the Bragg reflection wavelength of the second SSFBG 44 toward the long-wavelength side, the description of output of an instruction from the wavelength control portion 32 to the movement control portion 34 so as to expand the fixed portion interval L compared with the fixed portion interval L set in step S2 is replaced by output of an instruction from the wavelength control portion 72 to the temperature controller 68 to raise the temperature of the SSFBG formation portion 94 of the second SSFBG 92 in contact with the base plate 80.

In other steps also, clearly the descriptions are to be changed in keeping with the above changes to step S2 and to step S5, and so descriptions of changes to steps other than the above step S2 and step S5 are omitted.

As explained above, an optical code division multiplex transmission method of the present invention comprises a phase adjustment step in which the extent of the eye opening of optical pulses output from a second SSFBG which is the decoder is measured with a correlation waveform monitor, and the operating wavelength of the second SSFBG is adjusted such that the extent of the eye opening is maximum. As a result signals encoded by an encoder are decoded without distortion as the same signals as before decoding by the decoder, so that optical code division multiplex transmission can be performed in the optimum state.

Further, an optical code division multiplex transmission device of the present invention comprises either a correlation waveform monitor, a wavelength control portion and a movement control portion, or a correlation waveform monitor, a wavelength control portion and a temperature control portion, so that the optical code division multiplex transmission method of the present invention, comprising the phase adjustment step to adjust the operating wavelength of the second SSFBG, can be performed.

What is claimed is:

1. An optical code division multiplex transmission method, comprising:
   an encoding step on the transmitting side using an encoder comprising a first Superstructured Fiber Bragg Grating (SSFBG);
   a decoding step on the receiving side using a decoder comprising a second SSFBG having a phase structure opposite that of the first SSFBG; and
   a phase adjustment step of adjusting the operating wavelength of the second SSFBG such that the extent of an eye opening of optical pulses output from the second SSFBG is maximum;

wherein said phase adjustment step comprises:
- a step S1 of acquiring a first data item reflecting the extent of the eye opening of optical pulses output from the second SSFBG comprised by said decoder;
- a step S2 of displacing the operating wavelength of said second SSFBG to the short-wavelength side;
- a step S3 of acquiring a second data item reflecting the extent of the eye opening of optical pulses output from said second SSFBG;
- a step S4 of comparing said first data item and said second data item;
- a step S5 of returning to said step S2 if the extent of the eye opening corresponding to said first data item is smaller than or equal to the extent of the eye opening corresponding to said second data item, and of displacing the operating wavelength of said second SSFBG to the long-wavelength side if the extent of the eye opening corresponding to said first data item is larger than the extent of the eye opening corresponding to said second data item;
- a step S6 of acquiring a third data item reflecting the extent of the eye opening of optical pulses output from said second SSFBG;
- a step S7 of comparing said first data item and said third data item; and,
- a step S8 of returning to said step S5 if the extent of the eye opening corresponding to said first data item is larger than or equal to the extent of the eye opening corresponding to said third data item, and of interchanging said third data item and said first data item, and returning to said step S2, if the extent of the eye opening corresponding to said first data item is smaller than the extent of the eye opening corresponding to said third data item.

2. The optical code division multiplex transmission method according to claim 1, wherein:
- step S2, in which the operating wavelength of said second SSFBG is displaced to the short-wavelength side, is a step of shortening the lattice spacing of said second SSFBG by narrowing the interval between fixed portions which fix in place said second SSFBG; and,
- step S5, in which the operating wavelength of said second SSFBG is displaced to the long-wavelength side, is a step of lengthening the lattice spacing of said second SSFBG by broadening the interval between fixed portions which fix in place said second SSFBG.

3. The optical code division multiplex transmission method according to claim 1, wherein:
- step S2, in which the operating wavelength of said second SSFBG is displaced to the short-wavelength side, is a step of shortening the effective lattice spacing of said second SSFBG by lowering the temperature of said second SSFBG; and,
- step S5, in which the operating wavelength of said second SSFBG is displaced to the long-wavelength side, is a step of lengthening the effective lattice spacing of said second SSFBG by raising the temperature of said second SSFBG.

* * * * *